United States Patent
Takamura

(10) Patent No.: US 9,361,235 B2
(45) Date of Patent: Jun. 7, 2016

(54) INFORMATION PROCESSING APPARATUS, METHOD OF CONTROLLING THE SAME AND COMPUTER-READABLE STORAGE MEDIUM

(71) Applicant: CANON KABUSHIKI KAISHA, Tokyo (JP)

(72) Inventor: Akihiro Takamura, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/570,306

(22) Filed: Dec. 15, 2014

(65) Prior Publication Data
US 2015/0178212 A1 Jun. 25, 2015

(30) Foreign Application Priority Data
Dec. 19, 2013 (JP) .................................. 2013-263022

(51) Int. Cl.
*G06F 12/00* (2006.01)
*G06F 12/08* (2016.01)

(52) U.S. Cl.
CPC ........ *G06F 12/0862* (2013.01); *G06F 12/0802* (2013.01); *G06F 2212/6028* (2013.01)

(58) Field of Classification Search
CPC ..................... G06F 12/0862; G06F 2212/6028; G06F 12/0802
USPC .......................................................... 711/137
See application file for complete search history.

(56) References Cited

U.S. PATENT DOCUMENTS

| 6,549,986 B1 * | 4/2003 | Spence | ............... | G06F 12/0864 711/125 |
| 2002/0091913 A1 * | 7/2002 | Fukagawa | ............. | G06F 9/3836 712/218 |
| 2003/0126116 A1 * | 7/2003 | Chen | ................... | G06F 12/0862 |

FOREIGN PATENT DOCUMENTS

JP        H10-320285 A     12/1998

* cited by examiner

*Primary Examiner* — Jae Yu
(74) *Attorney, Agent, or Firm* — Carter, DeLuca, Farrell & Schmidt, LLP

(57) ABSTRACT

A cache storage apparatus has an entry including a tag bit for managing an address in the memory of the data, the data, and a reference count for managing a number of times that the data is referenced. If it is possible to read in the data from the entry, in a case where the reference address is for a prefetch, a value of the reference count of the entry is increased, and in a case where the reference address is for a fetch, the value of the reference count of the entry is decreased. If it is not possible to read in the data from the entry, in a case where the reference address is for a prefetch, a replacement of prefetched data in the entry is prohibited until the value of the reference count of the entry becomes zero.

11 Claims, 7 Drawing Sheets

INFORMATION PROCESSING APPARATUS, METHOD OF CONTROLLING THE SAME AND COMPUTER-READABLE STORAGE MEDIUM

BACKGROUND OF THE INVENTION

1. Field of the Invention

The present invention relates to an information processing technique for controlling fetching and prefetching with respect to a cache storage apparatus for data in memory.

2. Description of the Related Art

While speeds of processing apparatuses, and DRAM, which is often used as a main memory, have improved due to improvements in the integration of semiconductors, the improvement in speeds of DRAM has been smaller than the improvements of speeds of processing apparatuses. In order to cancel the gap in speeds between the two, cache memory, which is of low capacity but is high speed has been arranged between a high speed processing apparatus and a low speed main memory.

Regarding cache memory, there are many cases in which, when a memory access is performed, contents of a main memory are first copied into the cache memory; in order to suppress a memory latency, a cache prefetch is performed in which contents of the main memory are copied into the cache memory in advance for an address range to be used.

A prefetch, for a fetch which is for actually performing processing, performed as much as possible in advance can suppress memory latency. However, if the prefetch is performed too far in advance, there is a problem in that the data that is prefetched to be used thereafter will be replaced with data that is newly prefetched.

In Japanese Patent Laid-Open No. H10-320285, a lock bit is set when data that is a prefetch target is stored so that the data that is prefetched is not replaced prior to being read out. Then, when the prefetched data that was locked by the lock bit is read out, the lock bit is canceled. With this, configuration is taken such that data that is prefetched and has not been used even one time is not replaced. However, with this approach, the problem still remains that, for data that will be used two or more times, because the data become a replace target when the lock is cancelled at the point in time when it is used one time, the data that is prefetched to be used thereafter will be replaced by data that is newly prefetched.

SUMMARY OF THE INVENTION

The present invention provides an information processing technique by which in addition to it being possible to reduce a cache capacity, it is possible to perform efficient cache usage.

In order to achieve the above object, an information processing apparatus is provided with the following configuration by the present invention. Specifically, an information processing apparatus that controls fetching and prefetching with respect to a cache storage apparatus for data in a memory, comprises a cache storage apparatus having, as an entry for managing data that is a cache target, an entry including a tag bit for managing an address in the memory of the data, the data, and a reference count for managing a number of times that the data is referenced; a determination unit configured to determine, based on a reference address, whether or not it is possible to read in data from an entry corresponding to the cache storage apparatus; and a control unit configured to control at least one of a prefetch and a fetch based on a result of the determination by the determination unit, wherein the control unit, in a case where the result of the determination by the determination unit is that it is possible to read in the data from the entry, increases, in a case where the reference address is for a prefetch, a value of the reference count of the entry, decreases, in a case where the reference address is for a fetch, the value of the reference count of the entry, and in a case where the result of the determination by the determination unit is that it is not possible to read in the data from the entry, prohibits, in a case where the reference address is for a prefetch, a replacement of the prefetched data in the entry until the value of the reference count of the entry becomes zero.

By virtue of the present invention, an information processing technique can be provided in which it is possible to reduce a cache capacity and also it is possible to perform efficient cache usage.

Further features of the present invention will become apparent from the following description of exemplary embodiments (with reference to the attached drawings).

DESCRIPTION OF THE EMBODIMENTS

Embodiments of the present invention will now be described hereinafter in detail, using the drawings.

<First Embodiment>

In a first embodiment, an example is shown of a cache that has one reference counter for each cache entry of each Way, where there are 2 Ways, but the number of Ways, and the correspondence relationship between a cache entry and a reference counter can be changed.

Figure 1:
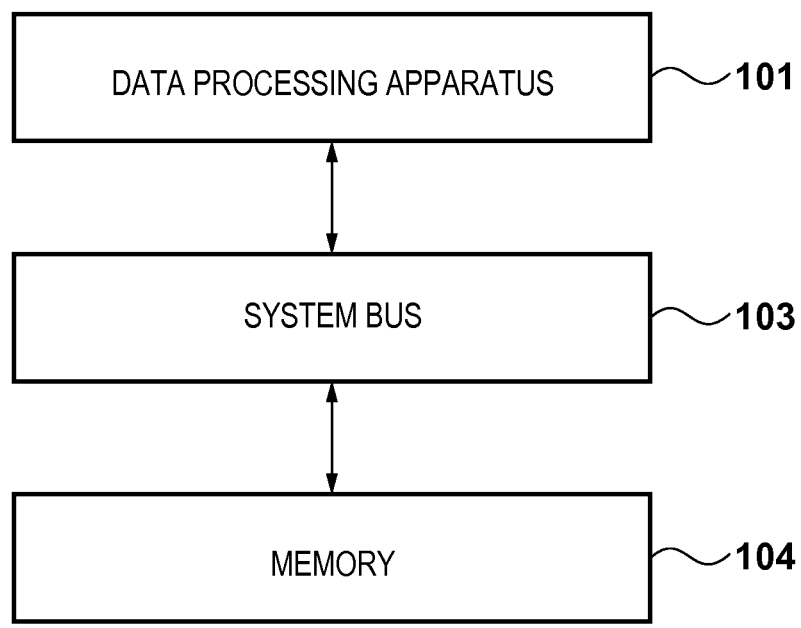
FIG. 1 is an overall view of a computer system of a first embodiment.

Firstly, FIG. 1 shows an overall view of a computer system of the first embodiment. The computer system of the first embodiment is comprised of a data processing apparatus 101, which is an information processing apparatus that has a prefetch mechanism, a memory 104, and a system bus 103 connecting the two.

Figure 2:
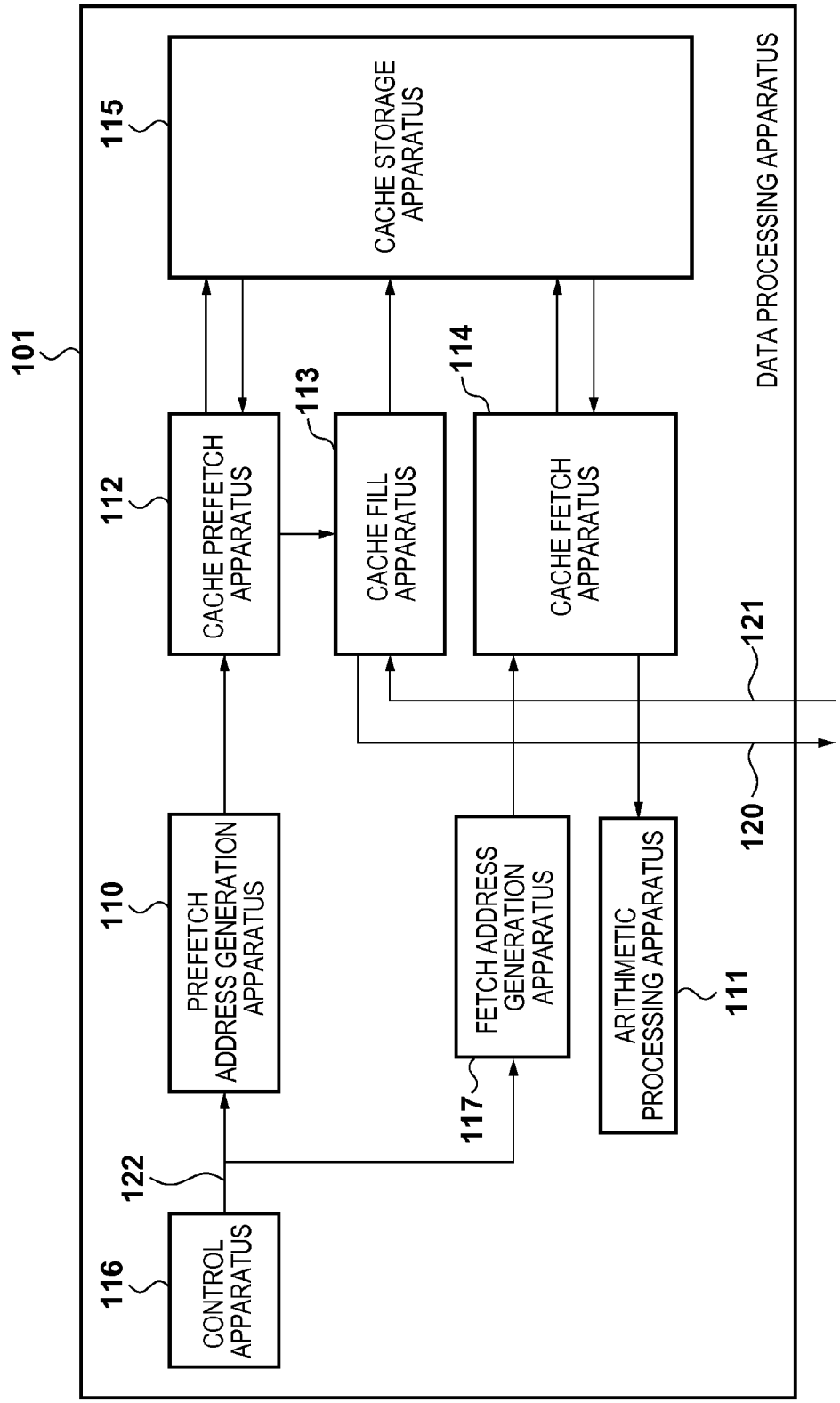
FIG. 2 is a view for showing a data processing apparatus of the first embodiment.

Next, FIG. 2 shows a configuration of the data processing apparatus 101 of the first embodiment. The data processing apparatus 101 performs address generation for data necessary for an arithmetic operation, and performs arithmetic processing using data read out from the memory 104. The data processing apparatus 101 comprises a prefetch address generation apparatus 110, an arithmetic processing apparatus 111, a cache prefetch apparatus 112, a cache fill apparatus 113, a cache fetch apparatus 114, a cache storage apparatus 115, a control apparatus 116, and a fetch address generation apparatus 117.

Note that in the relationship between the cache storage apparatus 115 and the memory 104, in general the former is low capacity and high speed, and the latter is large capacity and low speed.

Figure 3:
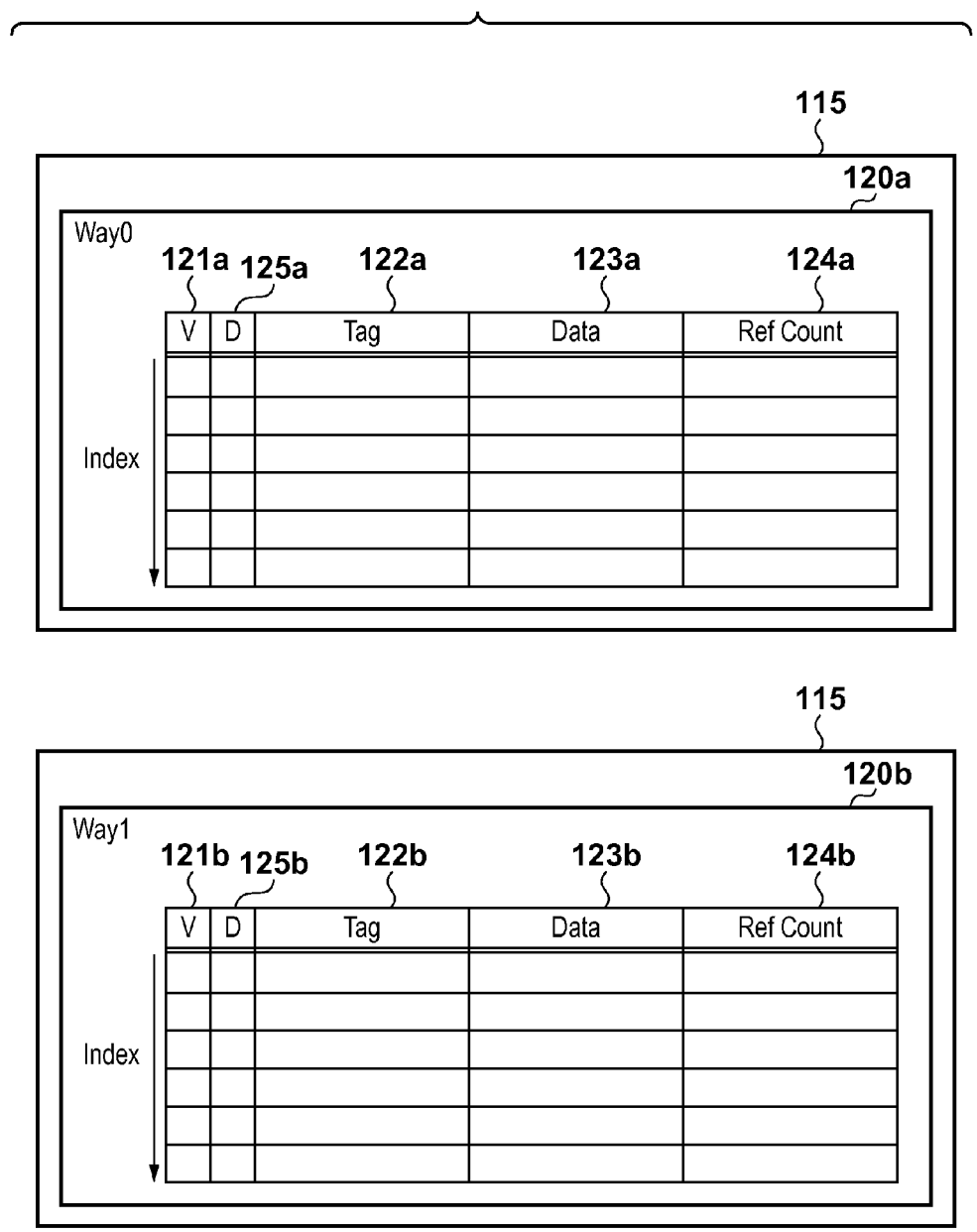
FIG. 3 is a view for showing a cache storage apparatus of the first embodiment.

Details of the cache storage apparatus 115 are shown in FIG. 3. Regarding the cache storage apparatus 115, a table having one or more entries is configured plurally in two Ways (Way 0 and Way 1). Each entry manages data, and it is possible to read or write the data by specifying the Way and the Index (cache index) for the data.

In Way 0, a single entry of data comprises an entry valid (Valid:V) bit 121a, a data valid (D) bit 125a, a tag (Tag) bit 122a, data (data) 123a, and a reference count (RefCount) 124a.

The entry valid bit 121a indicates that the data valid bit 125a, the Tag bit 122a, and the reference count 124a of the entry are valid. Here, in a case where a value of the entry valid bit 121a is "1", this indicates that the entry is valid, and in a case where the value of the entry valid bit 121a is "0", this indicates that the entry is invalid.

The data valid bit 125a indicates that the data 123a stored in the entry is valid. Here, in a case where a value of the data valid bit 125a is "1", this indicates that the data 123a is valid, and in a case where the value of the data valid bit 125a is "0", this indicates that the data 123a is invalid.

The Tag bit 122a, combined with an address bit that the Index contains, indicates an address on the memory 104 of the data 123a that is a cache target. The data 123a is a copy of the data on the memory 104 corresponding to the address indicated by the address bit that the Index contains and the Tag bit 122a. The reference count 124a indicates a number of times that the data is referenced (a prefetch number) for prefetching minus a number of times that the data is referenced (a fetch number) for fetching for the same entry. In a case where the reference count 124a is larger than zero, it indicates that data that will be referenced thereafter by a fetch has been entered into the entry.

Similarly, in Way 1, a single entry of data comprises an entry valid (Valid:V) bit 121b, a data valid (D) bit 125b, a tag (Tag) bit 122b, data (data) 123b, and a reference count (RefCount) 124b.

Operation of the data processing apparatus 101 of the first embodiment will be illustrated in order. In the data processing apparatus 101, the control apparatus 116 asserts a Start signal 122. If the Start signal 122 can be asserted, the prefetch address generation apparatus 110 and the fetch address generation apparatus 117 initiate operation. The prefetch address generation apparatus 110 and the fetch address generation apparatus 117, when operation is initiated, generate, by the same sequence, addresses (a reference address) to be referenced.

Figure 4:
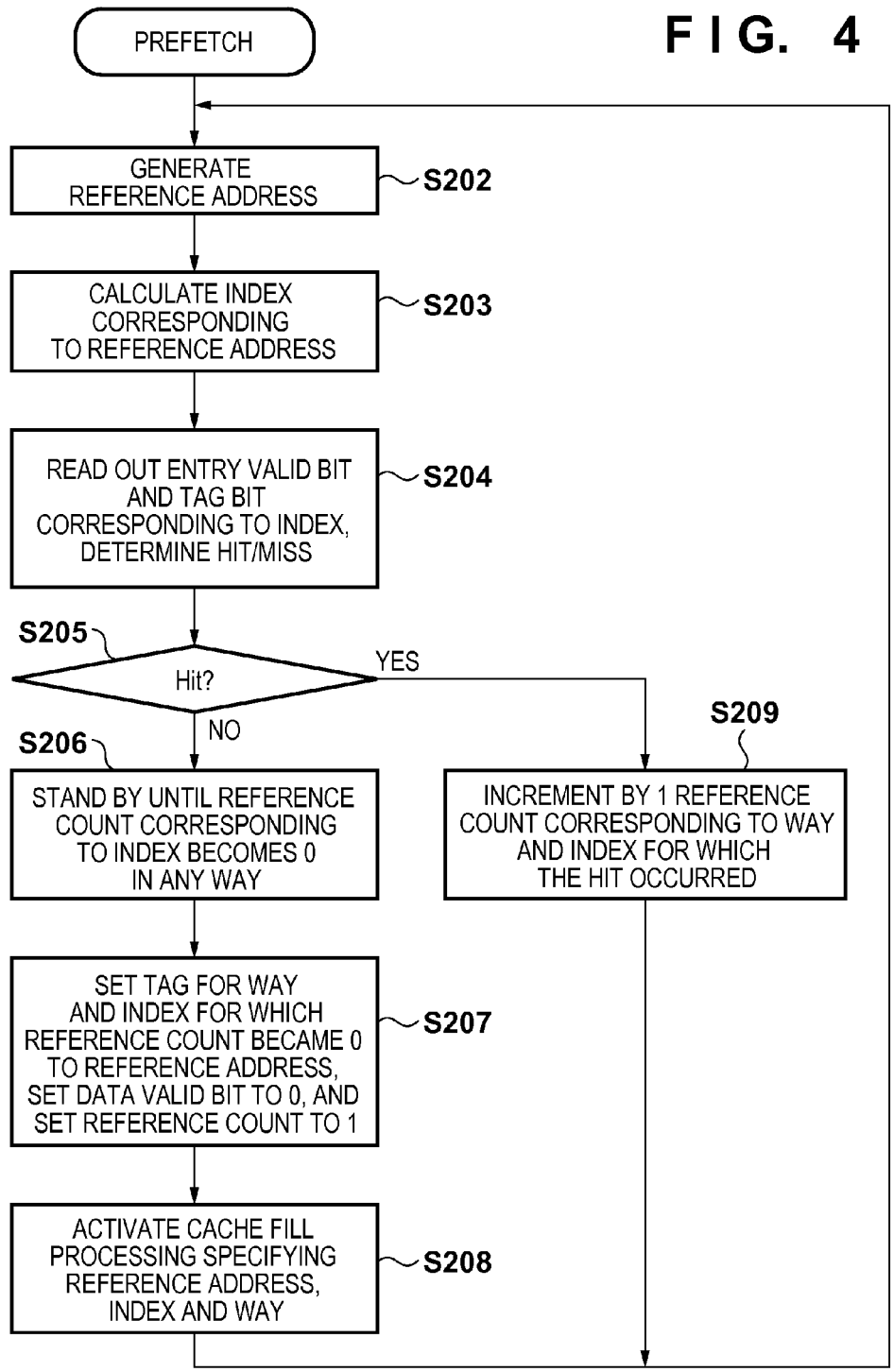
FIG. 4 is a flowchart for showing prefetch processing of the first embodiment.

A processing flow for when the prefetch address generation apparatus 110 generates a prefetch address is shown in FIG. 4.

In step S202, the prefetch address generation apparatus 110 generates a reference address for a prefetch. When the cache prefetch apparatus 112 receives this reference address, it executes a processing sequence of step S203-step S209.

In step S203, the cache prefetch apparatus 112 calculates an Index of the cache storage apparatus 115 corresponding to the reference address. In step S204, the cache prefetch apparatus 112 performs reading out of the entry valid bit and the Tag bit of the entry corresponding to the Index in the cache storage apparatus 115. In addition, it determines whether a Hit or a Miss occurred by investigating whether or not the entry valid bit is "1" and the Tag bit is the same as the reference address. In a case where for either of the Ways the entry valid bit is "1" and the reference address and the Tag bit are the same, it is determined to be a Hit (cache hit), and when that is not the case, it is determined to be a Miss (cache miss).

Here, a cache hit has the meaning that the data necessary for the processing exists in the cache storage apparatus 115, and the data can be read from the cache storage apparatus 115. Also, a cache miss has the meaning that the data necessary for the processing does not exist in the cache storage apparatus 115, and the data cannot be read from the cache storage apparatus 115. In a case of a cache miss, the required data is copied from the memory 104.

In step S205, the cache prefetch apparatus 112 determines whether or not a Hit occurred. In the case of a Hit (YES in step S205), the processing proceeds to step S209, and the cache prefetch apparatus 112 adds one to the value of the reference count of the entry corresponding to the Way and Index for which the Hit occurred, incrementing by one the number of times referenced by prefetching.

Meanwhile, in a case of a Miss (NO in step S205), cache replacement processing of step S206-step S208 is performed.

In step S206, the cache prefetch apparatus 112 stands by until the value of the reference count of the entry corresponding to the Index calculated in either of the Ways becomes "0". In other words, until the value of the reference count becomes "0", replacement of the prefetched data is prohibited. With this, the prefetched data being replaced prior to being used in the fetch is prevented.

In step S207, the cache prefetch apparatus 112 updates the contents of the entry corresponding to the Way and the Index for which the value of the reference count is "0", setting the entry valid bit to "1", setting the tag to the reference address, setting the data valid bit to "0", and setting the value of the reference count to "1". In step S208, the cache prefetch apparatus 112 activates the cache fill processing specifying the reference address, the Way, and the Index.

Figure 5:
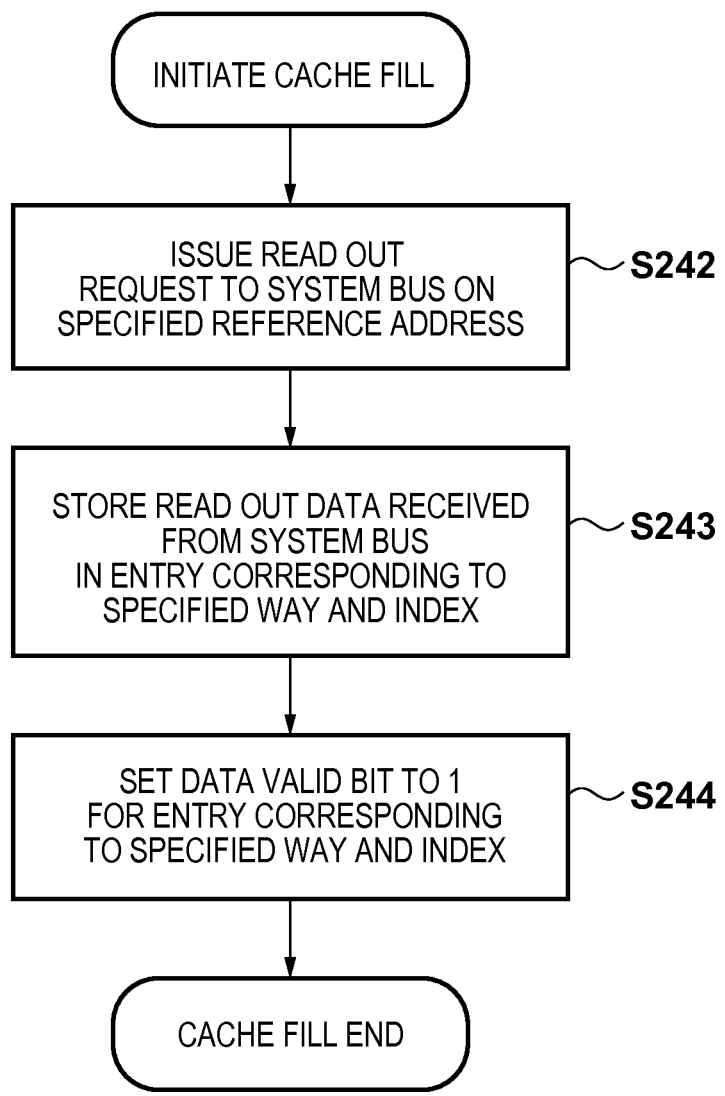
FIG. 5 is a flowchart for showing cache fill processing of the first embodiment.

A processing flow of cache fill processing by the cache fill apparatus 113 is shown in FIG. 5.

In step S242, the cache fill apparatus 113 issues a read request with the specified reference address to the system bus. In the read request, a read request (Read Request) signal line 120 (FIG. 2) is used. When, in step S243, the cache fill apparatus 113 receives data read out from the system bus 103 by a read data (Read Data) signal line 121, it stores the data in an entry corresponding to the Way and Index specified by the cache storage apparatus 115. When storage of the data ends, the cache fill apparatus 113, in step S244, sets the data valid bit of the entry corresponding to the Way and Index specified by the cache storage apparatus 115 to "1".

Figure 6:
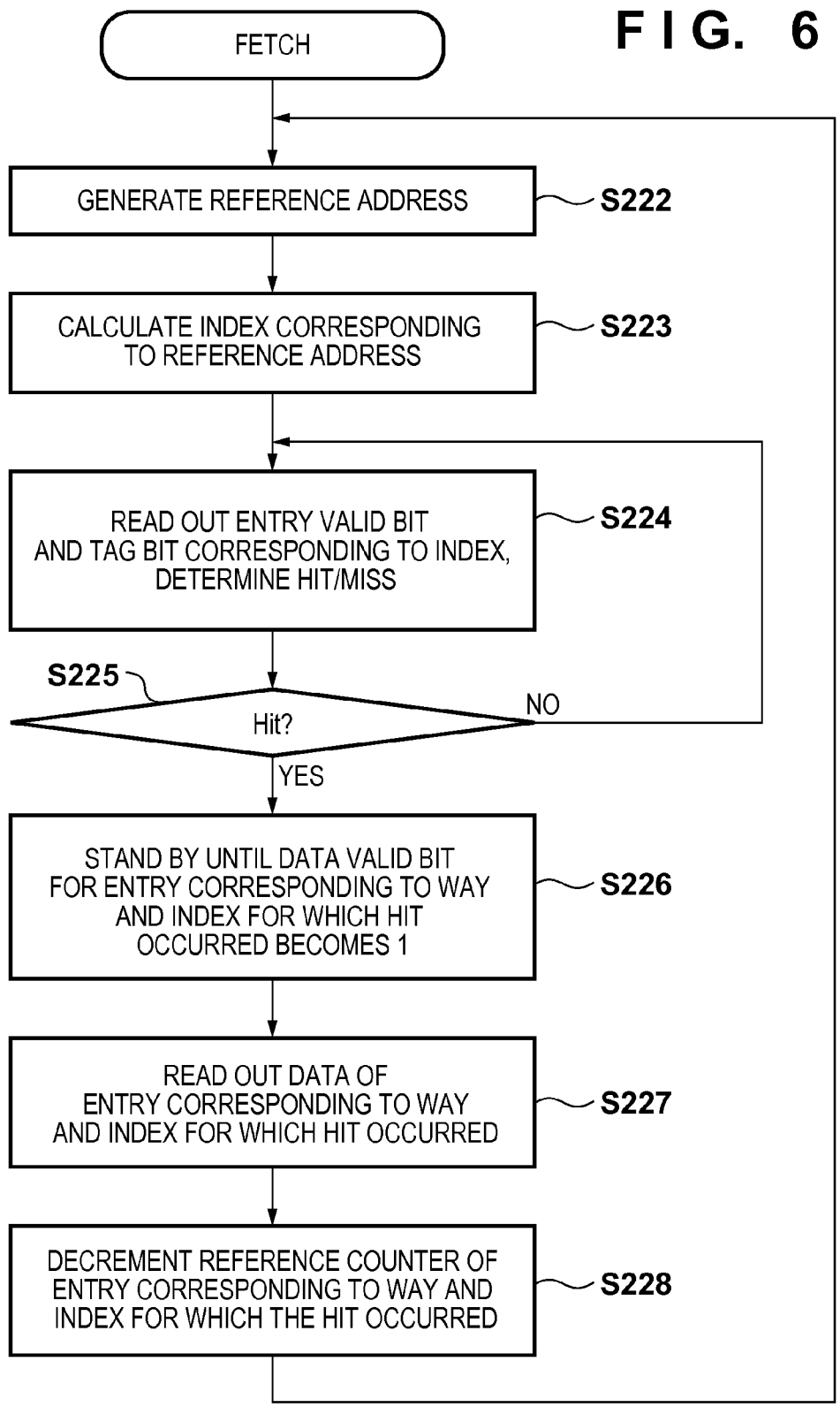
FIG. 6 is a flowchart for showing fetch processing of the first embodiment.

Next, a processing flow for when the fetch address generation apparatus 117 generates a fetch address is shown in FIG. 6.

In step S222, the fetch address generation apparatus 117 generates a reference address for a fetch. When the cache fetch apparatus 114 receives this reference address, it executes a processing sequence of step S223-step S228.

In step S223, the cache fetch apparatus 114 calculates an Index of the cache storage apparatus 115 corresponding to the reference address. In step S224, the cache fetch apparatus 114 performs a determination as to whether a Hit or a Miss occurred similarly to step S204.

In step S225, the cache fetch apparatus 114 determines whether or not a Hit occurred. In the case of a Miss (NO in step S225), the processing of step S224 and step S225 is repeated until a Hit occurs.

Meanwhile, in the case of a Hit, (YES in step S225), the processing proceeds to step S226, and the cache fetch apparatus 114 stands by until the data valid bit of the entry corresponding to the Way and Index of the Hit becomes "1". In step S227, the cache fetch apparatus 114 reads from the cache storage apparatus 115 and outputs to the arithmetic processing apparatus 111 the data (cache data) of the entry corresponding to the Way and Index for which the Hit occurred. In step S228, the cache fetch apparatus 114 decrements the value of the reference count of entry corresponding to the Way and Index for which the Hit occurred decreasing the reference count by one for each of the number of times there was a reference by fetching.

In this way, as fetching/prefetching control, the same reference address sequence is generated in prefetching as in fetching, and a reference counter indicating the difference in the number of times prefetching has been performed an the number of times fetching has been performed is arranged for each entry of the cache. In a case of a cache miss, a data replacement is performed after having waited until the reference counter becomes zero.

As explained above, by the first embodiment, a difference between the number of times reference by prefetching has been performed an the number of times reference by fetching has been performed is generated in the reference count, and the replacement of prefetched data corresponding to the data in memory is performed after having waited until the value of the reference count becomes "0". In other words, the prefetched data is not released until all of the fetching that references that data has been performed.

With this, the prefetched data being replaced prior to being used in the fetch can be prevented. Also, because data to be used thereafter is not replaced by prefetched data, it is possible to reduce cache misses. As a consequence, because it is possible to perform prefetching in advance to a maximum, a cache capacity can be reduced because memory latency due to prefetching is suppressed, and capability fluctuation can be reduced.

<Second Embodiment>

Figure 7:
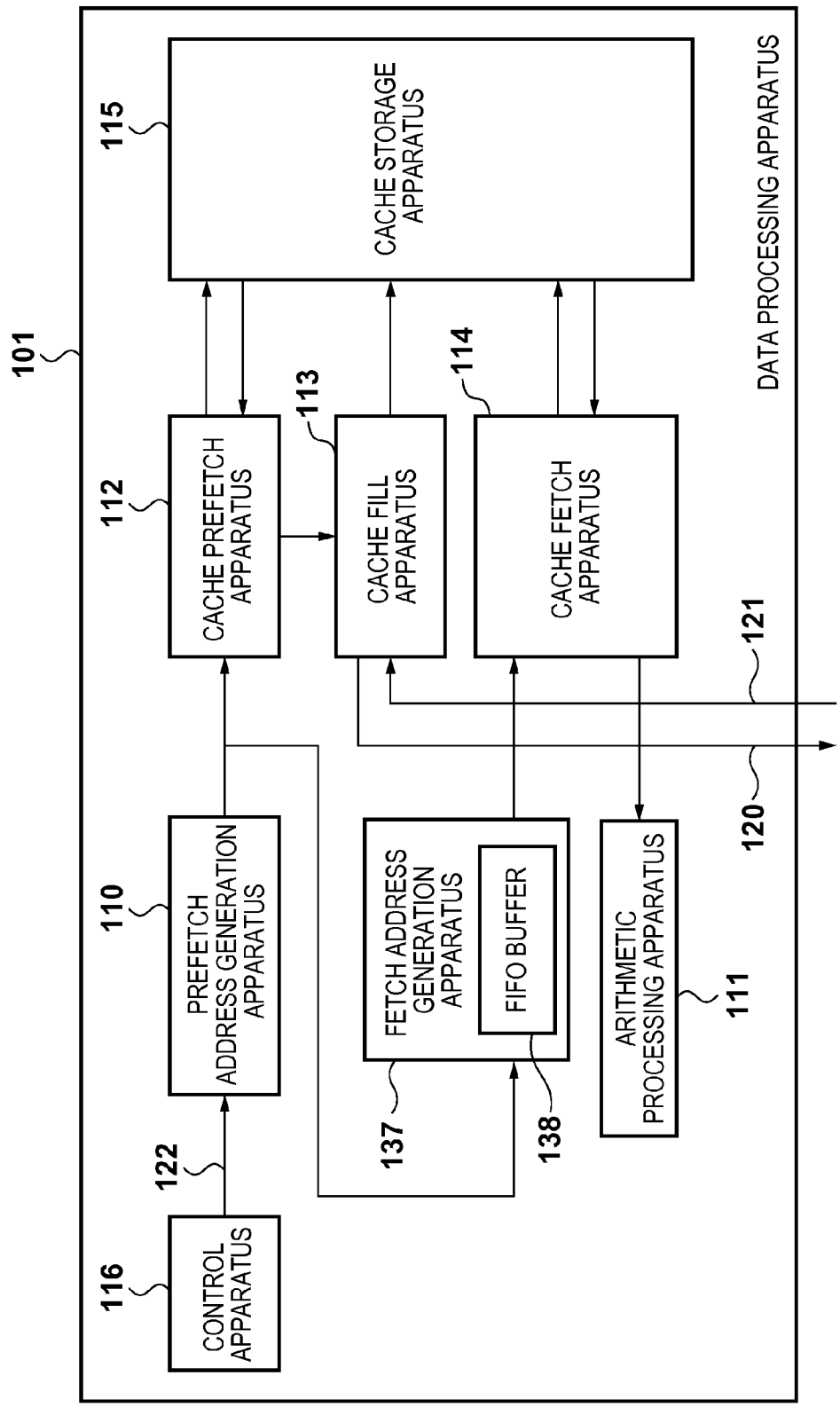
FIG. 7 is a view for showing a data processing apparatus of a second embodiment.

In FIG. 7, the configuration of the data processing apparatus 101 of a second embodiment is shown.

The points where the second embodiment differs from the first embodiment are that a fetch address generation apparatus 137 is comprised of a FIFO buffer 138 (first in first out buffer), and an output of the prefetch address generation apparatus 110 is connected to an input of the fetch address generation apparatus 137.

Here as well, when the prefetch address generation apparatus 110 and the fetch address generation apparatus 137 initiate operation, a reference address is generated by the same sequence. In a case where the FIFO buffer 138 is full, the prefetch address generation apparatus 110 stops the generation of the reference address. Operation other than this is the same as in the first embodiment.

In this case as well the same effect can be obtained as in the first embodiment.

Furthermore, in order to enhance parallelism of the prefetch operation and the fetch operation, the FIFO buffer may be arranged to hold a prefetch address that the prefetch address generation apparatus 110 outputs to the input of the cache prefetch apparatus 112.

In the first embodiment and in the second embodiment, examples are shown of cases in which the value of the reference count is incremented by one or decremented by one, but limitation is not made to this. In cases where simultaneously multiple prefetch processes or multiple fetch processes are performed concurrently, it is possible to increase or to decrease the value of the reference count by the number of Hits that occurred simultaneously.

Also, in cases where simultaneously multiple prefetch processes or multiple fetch processes are performed by concurrent operation, it is possible to calculate in the reference count for the same Way and the same Index for every cache index of a Way for which a Hit occurred (the number of Hits by a prefetch process—the number of Hits by a fetch process). In other words, the difference between the total number of prefetch Hits and the total number of fetch Hits is calculated in the reference count.

Also, the implementation of a reference count that functions by a counter that counts upwards can also be realized by a counter that counts downwards. In such a case, in the above described example, the configuration in which logically one was added/subtracted may be implemented by subtracting/adding one respectively. In these cases as well the same effect can be obtained as in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263022, filed Dec. 19, 2013 which is hereby incorporated by reference wherein in its entirety.

What is claimed is:

1. An information processing apparatus that controls fetching and prefetching with respect to a cache storage apparatus for data in a memory, comprising:
   a cache storage apparatus having, as an entry for managing data that is a cache target, an entry including a tag bit for managing an address in the memory of the data, the data, and a reference count for managing a number of times that the data is referenced;
   a determination unit configured to determine, based on a reference address, whether or not it is possible to read in data from an entry corresponding to the cache storage apparatus; and
   a control unit configured to control at least one of a prefetch and a fetch based on a result of the determination by the determination unit, wherein
   the control unit, in a case where a result of the determination by the determination unit is that it is possible to read in the data from the entry,
  increases, in a case where the reference address is for a prefetch, a value of the reference count of the entry,
  decreases, in a case where the reference address is for a fetch, the value of the reference count of the entry, and
in a case where a result of the determination by the determination unit is that it is not possible to read in the data from the entry,
  prohibits, in a case where the reference address is for a prefetch, a replacement of prefetched data in the entry until the value of the reference count of the entry becomes zero.

2. The information processing apparatus according to claim 1, wherein
the control unit,
in the case where the result of the determination by the determination unit is that it is not possible to read in the data from the entry,
in a case where the reference address is for a fetch, repeats the determination by the determination unit until it is possible to read in the data from the entry.

3. The information processing apparatus according to claim 1, wherein
the entry further includes a data valid bit for indicating that data stored in the entry is valid, and
the control unit, for an entry for which the value of the reference count becomes zero, sets the tag bit to the reference address, sets the data valid bit to zero, and sets the value of the reference count to one.

4. The information processing apparatus according to claim 1, wherein
the control unit issues a read request to the memory with the reference address, reads out data from the memory, stores the data into the entry corresponding to the reference address, and sets the data valid bit of the entry to one.

5. The information processing apparatus according to claim 3, wherein
the entry further includes an entry valid bit for indicating that the entry is valid, and
the determination unit, in a case where the entry valid bit indicates that the entry is valid, and the reference address and the tag bit of a corresponding entry are equivalent, determines that it is possible to read in the data from a corresponding entry of the cache storage apparatus.

6. The information processing apparatus according to claim 1, wherein
the cache storage apparatus is comprised of a plurality of Ways that each comprise a plurality of entries, and
the determination by the determination unit and the control by the control unit is performed for each of the plurality of Ways.

7. The information processing apparatus according to claim 1, further comprising:
a first generation unit configured to generate an address for a prefetch; and
a second generation unit configured to generate an address for a fetch; wherein
the reference address is generated by the first generation unit or the second generation unit.

8. The information processing apparatus according to claim 7, wherein
the first generation unit is connected to the cache storage apparatus via a cache prefetch apparatus for prefetching data to the cache storage apparatus, and
the second generation unit is connected to the cache storage apparatus via a cache fetch apparatus for fetching data on the cache storage apparatus, and
the second generation unit comprises a FIFO buffer, and
the first generation unit is further connected to the second generation unit, and
the second generation unit, in a case where the FIFO buffer is full, stops the generation of an address as the reference address.

9. The information processing apparatus according to claim 1, wherein,
in a case where a plurality of prefetches and a plurality of fetches are performed for the same entry in simultaneous concurrent operation, the control unit calculates a difference, between a total number of prefetches for which data could be read in from the entry and a total number of fetches for which data could be read in from the entry, in the reference count of the entry.

10. A method of controlling an information processing apparatus that controls fetching and prefetching with respect to a cache storage apparatus for data in a memory, wherein
the cache storage apparatus has, as an entry for managing data that is a cache target, an entry including a tag bit for managing an address in the memory of the data, the data, and a reference count for managing a number of times that the data is referenced,
the method comprising:
determining, based on a reference address, whether or not it is possible to read in data from an entry corresponding to the cache storage apparatus; and
controlling at least one of a prefetch and a fetch based on a result of the determination determining, wherein
the controlling comprises:
in a case where a result of the determination determining is that it is possible to read in the data from the entry,
  increasing, in a case where the reference address is for a prefetch, a value of the reference count of the entry,
  decreasing, in a case where the reference address is for a fetch, the value of the reference count of the entry, and
in a case where a result of the determination determining is that it is not possible to read in the data from the entry,
  prohibiting, in a case where the reference address is for a prefetch, a replacement of prefetched data in the entry until the value of the reference count of the entry becomes zero.

11. A non-transitory computer readable storage medium storing a program for causing a computer to function as an information processing apparatus that controls fetching and prefetching with respect to a cache storage apparatus for data in a memory, wherein
the cache storage apparatus has, as an entry for managing data that is a cache target, an entry including a tag bit for managing an address in the memory of the data, the data, and a reference count for managing a number of times that the data is referenced, and wherein
the program causes the computer to function as
a determination unit configured to determine, based on a reference address, whether or not it is possible to read in data from an entry corresponding to the cache storage apparatus; and
a control unit configured to control at least one of a prefetch and a fetch based on a result of the determination by the determination unit, and wherein
the control unit
in a case where a result of the determination by the determination unit is that it is possible to read in the data from the entry, increases, in a case where the reference address is for a prefetch, a value of the reference count of the entry,
decreases, in a case where the reference address is for a fetch, the value of the reference count of the entry, and
in a case where a result of the determination by the determination unit is that it is not possible to read in the data from the entry,
prohibits, in a case where the reference address is for a prefetch, a replacement of prefetched data in the entry until the value of the reference count of the entry becomes zero.

* * * * *